May 18, 1965     L. A. LITSKY ET AL     3,184,362
APPARATUS FOR BONDING AN ANNULAR LINER TO A BEARING RING
Filed March 20, 1961
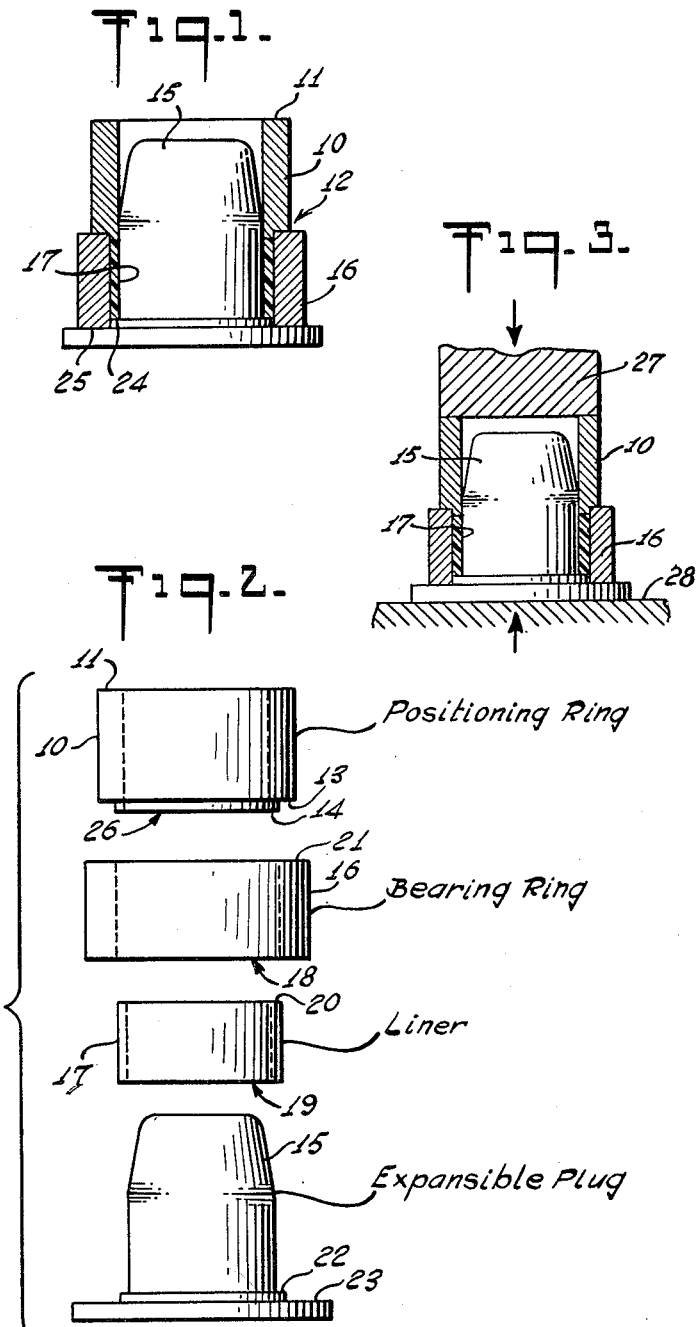
INVENTORS
Leonard A. Litsky
James D. Skelly
BY Roy C. Hopgood
ATTORNEY

United States Patent Office 3,184,362
Patented May 18, 1965

3,184,362
APPARATUS FOR BONDING AN ANNULAR LINER TO A BEARING RING
Leonard A. Litsky and James D. Skelly, New Britain, Conn., assignors to The Fafnir Bearing Company, New Britain, Conn., a corporation of Connecticut
Filed Mar. 20, 1961, Ser. No. 96,944
6 Claims. (Cl. 156—423)

This invention, generally, relates to the manufacture of bearings and, more particularly, to a new and improved apparatus to assemble bearing parts.

In the manufacture of some forms of bearings, such as self-aligning bearings, journal bearings, etc., an outer ring is prepared by bonding a suitable liner material therein. Usually, this bonding operation requires both heat and pressure, and it has been the practice to obtain the pressure by inserting an expansible plug in the liner, the plug expanding to a greater extent by the heat than the other parts. During expansion, the plug applies a substantially uniform radially outwardly directed pressure against the liner, pressing it into firm contact with the inner surface of the outer bearing ring.

In the past, there has been a considerable degree of difficulty in positioning the liner accurately within the bearing ring, and accordingly, the present invention has for one of its principal objects to provide an apparatus for assembling the liner and outer bearing ring accurately relative to each other. Accurate axially inward location of the liner within the bearing-ring bore is of importance when subsequent machining operations are to be performed on the bearing ring, because tool contact with the liner can cause undesirable results, not the least of which would be unsightliness of resulting burr or shred development at an axial end of the liner.

It is also an object of the present invention to provide a new and improved means for controlling the position of a liner material within an outer bearing ring during bonding.

Briefly, an apparatus in accordance with the invention is uniquely adapted to bond an annular liner to a bearing member, the apparatus including an expansible element dimensioned to fit closely within the bore of the liner and a positioning member in accordance with the invention is adapted to fit between the expansible element and a force applying means to press the expansible element within the bore of the annular liner. The positioning member includes an annular body member having at least two abutment surfaces spaced apart relative to each other a distance corresponding to a predetermined relative location of one edge of the liner and one edge of the bearing member.

The above and other objects and advantages of the invention will be understood more completely in view of the following detailed description of a preferred embodiment thereof taken in conjunction with the accompanying drawings, in which:

FIG. 1 is a view in elevation partly in section of an apparatus in accordance with the invention;

FIG. 2 is an exploded view in elevation of the component parts shown in FIG. 1; and FIG. 3 depicts in elevation the assembling of the bearing using arbor press means.

Referring to the drawings, one form of the invention includes an annular body member 10 having an upper surface 11 which is substantially uniform radially. The lower end 12 of the body member 10 is formed with two abutment surfaces 13 and 14, FIG. 2.

An expansible plug 15 is formed of any suitable material having a relatively high coefficient of thermal expansion relative to that of a bearing ring 16. For example, such a plug may be formed of aluminum, but the present invention is not limited to this material.

One purpose of the invention is to bond a liner 17 within the bore 18 of a bearing ring. While any suitable material may be used for the liner 17, the invention contemplates the use of a low friction fabric material with fibers having low frictional characteristics, including the polyamide resins marketed under the name of "nylon," the polyester resins marketed under the Dupont trade name "Dacron," polyethylene, the polymeric fluorocarbon resins, including tetrafluoroethylene, marketed under the Dupont trade name "Teflon," and the monochlorotetrafluoro-ethylene resins marketed under the trade name of "Kel-F" and "Fluorothene." Of course, other materials are available, the above being merely illustrative, and for the purposes of this description, the tetrafluoroethylene resins are preferred to the other resin fibers, since they withstand approximately 600° F. of temperature.

The low friction fiber materials, such as illustrated above, in most cases do not bond readily with other materials, and in order to assure a good bond, bondable fibers are woven on the reverse side of the woven low friction fibers, so that on the working face of the resulting woven material, a low friction surface will be provided, and on the opposite face a bondable surface will be provided. By this weaving, it is assured that the low friction fibers will be retained in position at all times, since the bondable fibers are positively retained in position on the supporting body, i.e., the ring 16.

By way of example, suitable backing materials which have been woven successfully with the polymeric fluorocarbon resins for the purpose of providing bonding fibers include cotton, rayon, nylon, wool, copper, steel, glass and the like.

In accordance with a preferred form of the invention, a suitable adhesive is applied to the inner surface of the outer ring 16, and in addition, this adhesive is applied to a Teflon fabric prior to cutting to size. Several coats of the adhesive may be necessary on the fabric.

After the second coat of adhesive has dried, the Teflon fabric is cut into strips at the desired length to fit a particular bearing size. The liner material 17 then is inserted within the ring 16, the adhesive side of the liner facing the adhesive side of the ring.

The diameter of the expansible plug 15 matches very closely the diameter of the bore 19 within the liner 17 so that at room temperatures, the plug 15 fits closely within the liner bore 19. In practice, it has been found desirable to use a suitable arbor press to push the liner 17 over the plug 15. While the liner 17 may be mounted on the plug 15 prior to the mounting of the ring 16 over the liner 17, the invention contemplates that the liner 17, preferably, is placed first within the bore 18 of the ring 16, and then, the assembled ring 16 and liner 17 are pressed over the expansible plug 15.

Due to the close dimensions of the plug 15 and the bores 18 and 19, it would be difficult to position the liner 17 accurately within the bore 18 so that it is centered as desired. The present invention provides a positioning ring as characterized by the body member 10 having the two abutment surfaces 13 and 14. The abutment surface 14 is displaced vertically and downwardly from the abutment surface 13 by a distance which corresponds to the distance that the edge 20 of the liner 17 is recessed from the edge 21 of the ring 16.

Now, by the application of pressure vertically upwardly against the expansible plug 15 and vertically downwardly against the upper, uniform edge of the body member 10, the liner 17 and the ring 16 are assembled accurately relative to each other over the expansible plug 15. This is depicted in FIG. 3 wherein arbor press means 27 well known in the art is brought to bear on the uniform edge of body member 10 while plug 15 is supported on surface 28 to provide a reacting force to said arbor press means.

While the above described upper positioning ring may be sufficient, it is contemplated also that a lower abutment surface 22 be formed about the lower end of the expansible plug 15 and an abutment surface 23 be formed annularly about the abutment surface 22. The two surfaces 22 and 23 are displaced relative to each other by a distance corresponding to the distance which the edge 24 of the liner 17 is recessed from the edge 25 of the ring 16.

While the abutment surfaces 22 and 23 may be formed separately or combined as desired, the preferred form of the invention embodies these surfaces 22 and 23 as being formed integrally with the expansible plug 15 at the lower end thereof.

Also in the preferred form of the invention, the diameter of a bore 26 through the body member 10 is slightly in excess of the diameter of the expansible plug 15, and the radial dimension of the abutment surface 14 is slightly less than the thickness of the liner 17. However, the outer diameter of the projection which forms the abutment surface 14 is slightly smaller than the diameter of the bore 18 in the ring 16. Therefore, these parts may be assembled radially. A preferred operation with the apparatus of the invention involves the placing of the ring 16 with the liner 17 therein on the expansible plug 15. Then the upper positioning ring is placed over the ring 16 and the assembly is subjected to pressure axially. This pressure fixes the ring 16 and liner 17 over the plug 15, the abutment surfaces 13 and 14 keeping the liner 17 centralized.

With the ring 16 and liner 17 positioned thusly on the expansible plug 15, the upper positioning ring is removed. Now heat is applied to the ring with the liner in place, and since the pressure from the thermally expanding plug 15 is uniform, due to uniform expansion under heat, the liner 17 remains positioned correctly during bonding. This pressure is needed in the curing of the adhesive to obtain an acceptable bond between the liner 17 and the bearing ring 16.

When the assembly is cooled to room temperature, the expansible plug 15 shrinks to its normal diameter. Because of the pressure during bonding and the flow of the adhesive during bonding, the bore 19 after bonding is slightly larger in diameter than before bonding, making it easy to remove the expansible plug 15 therefrom. Precise axially inward location of the liner means that liners can be designed for maximum length in relation to axial length of the bearing ring, there being only such minimum unlined axial extent at the ends of the bearing-ring bore as to permit machining without tool contact with the liner.

Obviously, many modifications and variations of the present invention are possible in the light of the above teachings. Therefore, it is to be understood that the invention is not limited in its applications to the details of construction and arrangement of parts specifically described or illustrated, and that within the scope of the appended claims, the invention may be practiced otherwise than as specifically described or illustrated.

We claim:

1. In apparatus for bonding an annular liner having a bore of predetermined dimensions to the bore of a bearing member, an expansible element dimensioned to fit closely within the bore of said liner, and an axial positioning member for axially positioning said liner axially inwardly from one of the bearing members, adapted to fit radially between said expansible element and the bore of said bearing member, and a force applying means to press the expansible element within the bore of said annular liner, said positioning member comprising an annular body member forming two abutment surfaces spaced apart relative to each other an axial distance corresponding to a predetermined relative axial location of one edge of said liner inwardly of the adjacent edge of said bearing member.

2. In apparatus for bonding an annular liner having a bore of predetermined dimensions to an outer bearing ring having a bore of predetermined inner diameter, an expansible element having an outer diameter to fit closely within the bore of said liner, and an axial positioning member adapted to fit radially between said expansible element and the bore of said bearing ring, and a force applying means to press the liner and bearing ring over the expansible element, said positioning member comprising an annular body member having an inner diameter at least equal to the said diameter of said expansible element, a first annular abutment surface on said body member, and a second annular abutment surface on said body member, said abutment surfaces being axially spaced apart relative to each other a distance corresponding to a predetermined relative location of one axial end of said liner and the corresponding axial end of said bearing ring.

3. In apparatus for bonding an annular liner having a bore of predetermined dimensions to an outer bearing ring having a bore of predetermined inner diameter, an expansible element having an external diameter to fit closely within the bore of said liner, and an axial positioning member adapted to fit radially between said expansible element and the bore of said ring, and a force applying means to press the liner and bearing ring over the expansible element, said positioning member comprising an annular body member having an inner diameter at least equal to the said diameter of said expansible element, a first annular abutment surface on said body member, said first abutment surface having a radial dimension less than the thickness of said annular liner and sized to axially abut said liner, a second annular abutment surface on said body member and sized to abut an axial end of said ring, and said abutment surfaces being spaced apart axially relative to each other a distance corresponding to a predetermined relative location of one axial end of said liner and the corresponding axial end of said bearing ring.

4. Apparatus according to claim 2, in which said expansible element includes an enlarged base at the axial end thereof which is opposite said positioning member, a first abutment surface at said base and of a diameter to clear the bearing ring bore while interfering with the adjacent axial end of said liner, and a second abutment surface at said base and sized to interfere with the adjacent axial end of said bearing ring, said last two mentioned abutment surfaces being axially spaced a predetermined distance determining the axially inward positioning offset of the second axial end of said liner with respect to the second axial end of said bearing ring.

5. In an apparatus for bonding an annular liner having a bore of predetermined dimensions to an outer bearing ring having a bore of predetermined inner diameter, an expansible plug having an external diameter to fit closely within the bore of said liner, and an axial positioning member adapted to fit radially between said expansible plug and the bore of said ring, said positioning member comprising an annular body member having an inner diameter at least equal to the said diameter of said expansible plug, a first annular abutment surface on said body member, said first abutment surface being stepped to a radial dimension less than the thickness of said annular liner and sized to axially abut said liner, and a second annular abutment surface on said body member and sized to abut an axial end of said ring, said abutment surfaces being spaced apart axially relative to each other a distance corresponding to a predetermined relative location of one axial end of said liner and the corresponding axial end of said bearing ring.

6. Apparatus according to claim 5, in which said expansible plug includes an enlarged base at the axial end thereof which is opposite said positioning member, a first abutment surface at said base and of a diameter to clear the bearing ring bore while interfering with the adjacent axial end of said liner, and a second abutment surface at said base and sized to interfere with the adjacent axial end of said bearing ring, said last two mentioned abutment surfaces being axially spaced a predetermined distance determining the axially inward positioning offset of the second axial end of said liner with respect to the second axial end of said bearing ring.

References Cited by the Examiner
UNITED STATES PATENTS

| | | | |
|---|---|---|---|
| 2,129,125 | 9/38 | Geyer | 308—238 XR |
| 2,424,878 | 7/47 | Crook | 156—294 |
| 2,814,538 | 11/57 | Connolly | 308—238 XR |
| 2,958,927 | 11/60 | Kravats | 308—238 XR |
| 3,068,552 | 12/62 | Williams et al. | 308—238 XR |

EARL M. BERGERT, *Primary Examiner.*
CARL F. KRAFFT, *Examiner.*

UNITED STATES PATENT OFFICE
CERTIFICATE OF CORRECTION

Patent No. 3,184,362                     May 18, 1965

Leonard A. Litsky et al.

It is hereby certified that error appears in the above numbered patent requiring correction and that the said Letters Patent should read as corrected below.

Column 3, line 70, for "inwardly from one of the bearing members" read -- inwardly from one end of the bearing member --.

Signed and sealed this 31st day of May 1966.

(SEAL)
Attest:

ERNEST W. SWIDER
Attesting Officer

EDWARD J. BRENNER
Commissioner of Patents